(12) United States Patent
Riffee

(10) Patent No.: US 7,031,391 B1
(45) Date of Patent: Apr. 18, 2006

(54) NARROWBAND VIDEO CODEC

(75) Inventor: Robert Keith Riffee, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 817 days.

(21) Appl. No.: 08/800,574

(22) Filed: Feb. 18, 1997

(51) Int. Cl.
   *H04N 7/12* (2006.01)
(52) U.S. Cl. ................................. 375/240.27
(58) Field of Classification Search ............ 348/12–14, 348/384, 390, 845, 845.1, 14.01, 14.02, 14.08, 348/14.13; 371/30, 37.4; 455/3.1, 3.2, 5.1, 455/6.1; 386/95, 104; 375/240, 240.01, 375/240.25, 240.27, 240.24
   See application file for complete search history.

(56) References Cited

U.S. PATENT DOCUMENTS

| 3,944,742 | A |   | 3/1976  | Cunningham        |        |
|-----------|---|---|---------|-------------------|--------|
| 5,057,917 | A |   | 10/1991 | Shalkauser et al. |        |
| 5,068,723 | A |   | 11/1991 | Dixit et al.      |        |
| 5,119,375 | A |   | 6/1992  | Paneth et al.     |        |
| 5,280,540 | A |   | 1/1994  | Addeo et al.      |        |
| 5,305,195 | A |   | 4/1994  | Murphy            |        |
| 5,341,318 | A |   | 8/1994  | Balkanski et al.  |        |
| 5,343,240 | A |   | 8/1994  | Yu                |        |
| 5,347,305 | A |   | 9/1994  | Bush et al.       |        |
| 5,371,534 | A | * | 12/1994 | Dagdeviren et al. | 348/14 |
| 5,373,316 | A |   | 12/1994 | Ishinabe et al.   |        |
| 5,379,351 | A |   | 1/1995  | Fandrianto et al. |        |
| 5,389,965 | A |   | 2/1995  | Kuzma             |        |
| 5,404,248 | A |   | 4/1995  | Shimoda et al.    |        |
| 5,438,357 | A |   | 8/1995  | McNelley          |        |
| 5,442,400 | A |   | 8/1995  | Sun et al.        |        |
| 5,444,477 | A |   | 8/1995  | Yamadera et al.   |        |
| 5,446,744 | A |   | 8/1995  | Nagasawa et al.   |        |
| 5,453,780 | A |   | 9/1995  | Chen et al.       |        |
| 5,455,629 | A |   | 10/1995 | Sun et al.        |        |
| 5,488,418 | A |   | 1/1996  | Mishima et al.    |        |
| 5,495,284 | A |   | 2/1996  | Katz              |        |
| 5,502,727 | A |   | 3/1996  | Catanzaro et al.  |        |
| 5,504,759 | A | * | 4/1996  | Inoue et al.      | 386/95 |
| 5,515,296 | A |   | 5/1996  | Agarwal           |        |
| 5,541,640 | A |   | 7/1996  | Larson            |        |
| 5,541,982 | A |   | 7/1996  | Bergler           |        |
| 5,546,477 | A |   | 8/1996  | Knowles et al.    |        |
| 5,563,895 | A |   | 10/1996 | Malkamaki et al.  |        |

(Continued)

OTHER PUBLICATIONS

Junko Yoshida, "Japanese Tout POTS Videophones-Again", *EE Times*, pp. 118 & 119, Sep. 19, 1994.

(Continued)

*Primary Examiner*—Richard Lee
(74) *Attorney, Agent, or Firm*—Thomas R. FitzGerald, Esq.

(57) ABSTRACT

A narrowband video codec for generating an output stream of control, data, and error correction bits includes means for framing the outputs control and data bits into a series of sequential frames of bytes for transmission over an RF link of a controlled frequency. Each frame includes an identical sequence of bytes. Each frame of bytes includes, in sequence, two control bytes, a plurality of sequential sets of data bytes, and a plurality of error correction bytes. Each set of data bytes includes a sequence of at least one audio byte and a plurality of video bytes. At least one video byte is between each sequential audio byte. Each set of data bytes has its audio and video bytes in the same order as each other set of data bytes.

18 Claims, 12 Drawing Sheets

U.S. PATENT DOCUMENTS

| | | |
|---|---|---|
| 5,577,190 A | 11/1996 | Peters |
| 5,583,912 A | 12/1996 | Schillaci et al. |
| 5,757,416 A * | 5/1998 | Birch et al. ............... 455/6.1 |
| 5,784,572 A * | 7/1998 | Rostoker et al. ......... 348/14.01 |
| 5,825,408 A * | 10/1998 | Yuyama et al. .......... 348/14.01 |
| 6,134,223 A * | 10/2000 | Burke et al. ............. 348/4.08 |

OTHER PUBLICATIONS

MCI's Video Phone Advertisement, Undated and Source Unknown.

PictureTel System 4000 and Model 200 Advertisement, Undated and Source Unknown.

* cited by examiner

NARROWBAND VIDEO CODEC

This invention relates in general to codecs and in particular to narrowband video codecs for transmitting real time video and audio over rf links.

BACKGROUND

Modern military operation now require real time two way digital video communication. A video codec (coder, decoder) converts video images into digital signals and vice versa. Present video codecs are large, power hungry, and complex. Such codecs are used at video conferencing facilities and are typically housed in a controlled environment of an office building. Large and complex devices are both inappropriate and virtually useless for military operations, especially combat operations. Accordingly, there is a need for a compact and efficient codec to transmit real time color video with audio over existing tactical communication links, in particular radio frequency (rf) links.

SUMMARY

The invention provides a solution to the problem by providing a tactical military narrowband video codec that transmits real time color video and audio over rf communication links. The narrowband video codec has a small chassis, is battery powered, and performs real time video and audio compression and decompression, forward error correction, and digital data transmission via tactical radios. The codec operates in a half-duplex or full-duplex mode and interfaces with a variety of standard video and audio signals.

The narrowband video codec generates an output stream of control, data, and error correction bits. The codec frames the stream of bits into a series of sequential frames of bytes for transmission over an rf link of a controlled frequency. Each frame comprises an identical sequence of bytes and includes, in sequence, two control bytes, a plurality of sequential sets of data bytes and a plurality of error correction bytes. The data bytes include repeated sets of audio and video bytes. Each set of the data bytes has the audio and video bytes in the same order as each other set of data bytes in the frame. In particular, each set of data bytes has the same number of video bytes between sequential audio bytes. Each byte includes eight bits of data.

The codec supports communication links from 4.8 kbps to 256 kbps. It operates on a standard military battery for over 11 hours or can be powered from a standard AC outlet. It is compact and its front panel gives the user a choice of one of three different levels of video clarity. It includes two audio algorithms and two user selectable levels of Reed-Solomon forward error correction. It also includes two standard interfaces, MIL STD 118–144 and RS-422 interfaces. It's housing is three inches high by five inches wide by six inches deep. The back of the codec has a connector that is plug compatible with a standard military battery such as the BA5590 battery.

The narrowband video codec has a first digital signal processor for converting analog video signals into digital video signals and compressing the digital video signals into video bytes. A second digital signal processor decompresses digital video bytes into digital video signals and converts decompressed digital video signals into analog video signals. A third digital signal processor converts analog audio signals into digital audio signals. It further compresses the digital audio signals into audio bytes. Upon receipt of compressed audio bytes, it decompresses the audio bytes into digital audio signals and converts the decompressed digital audio signals into analog audio signals. The codec periodically refreshes the transmitted video image every 30 seconds.

DRAWINGS

Figure 3C:
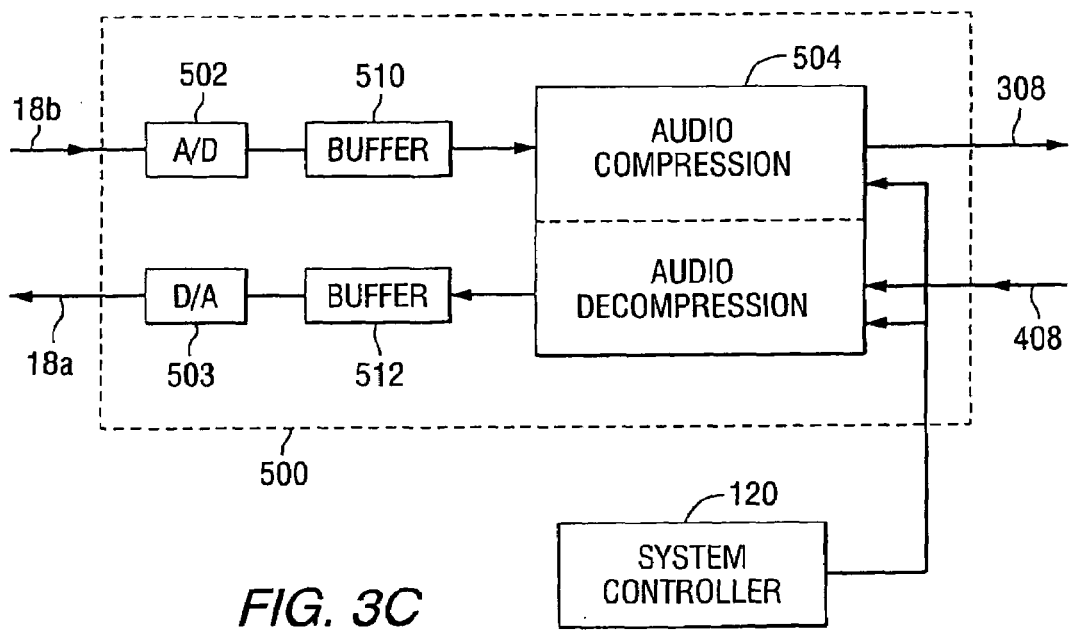
Figure 3A:
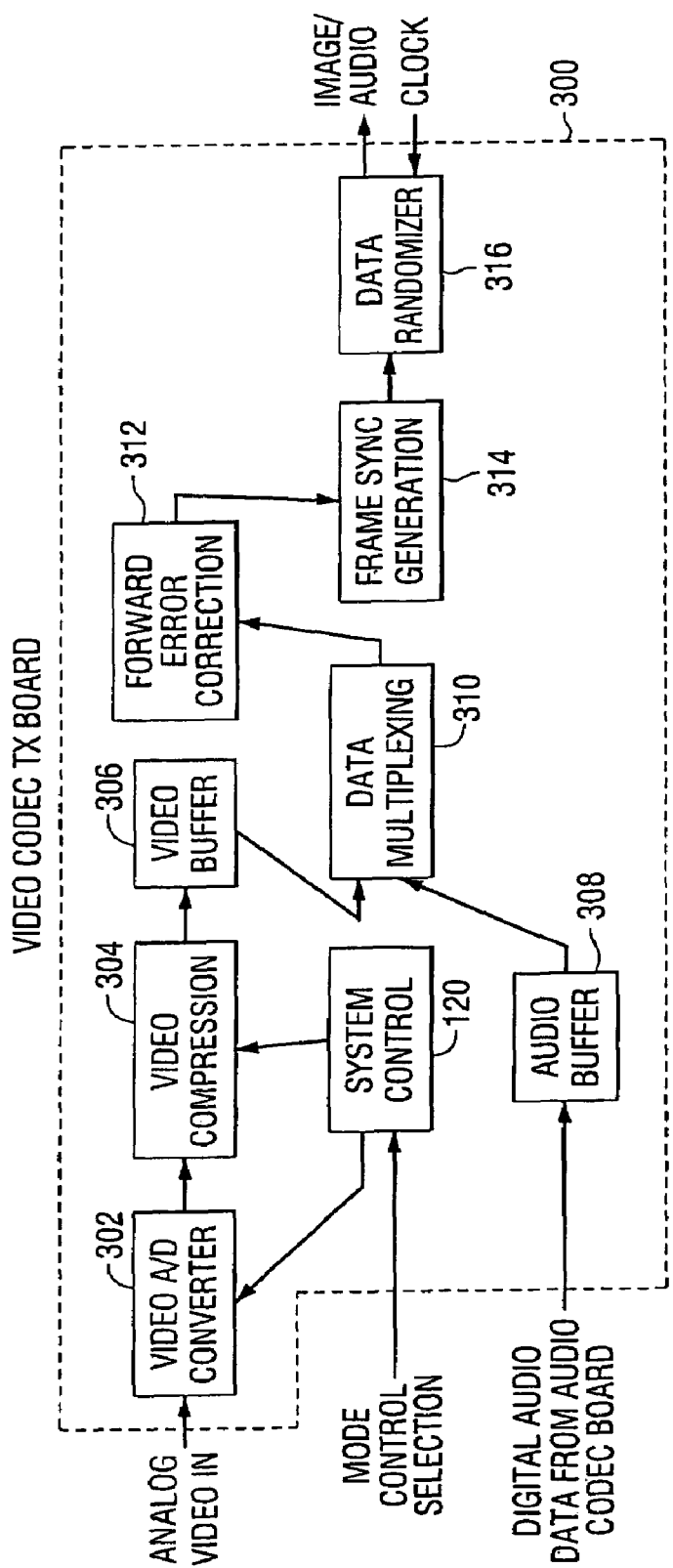
Figure 3B:
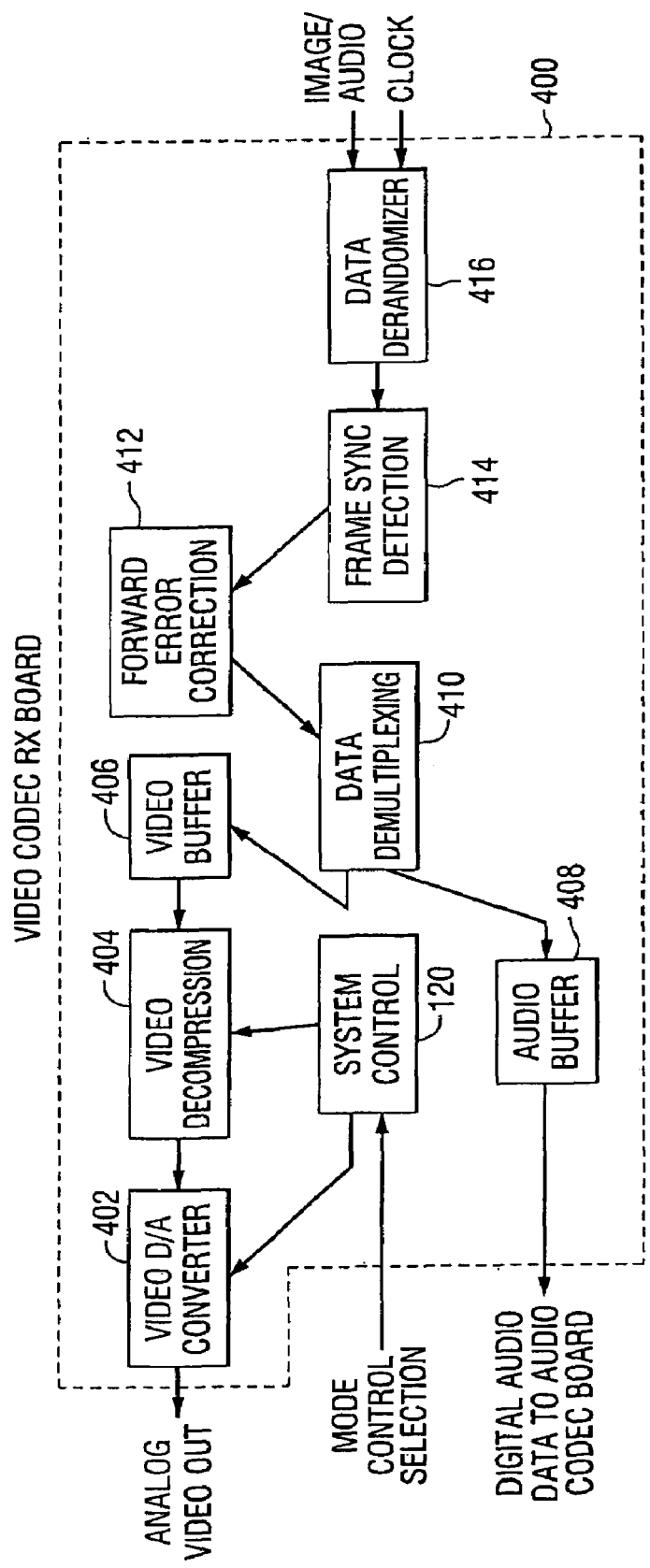
Figure 4A:
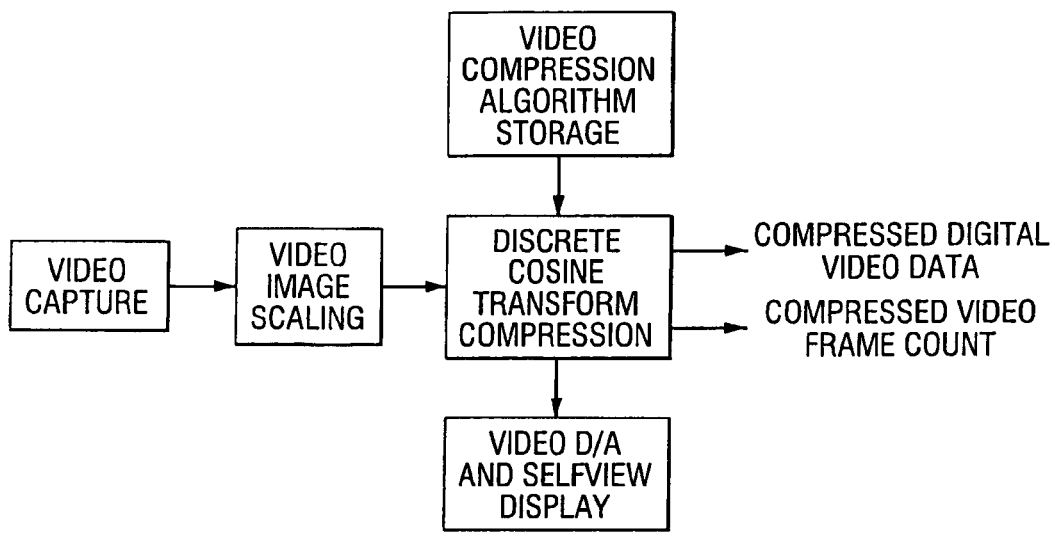
Figure 4B:
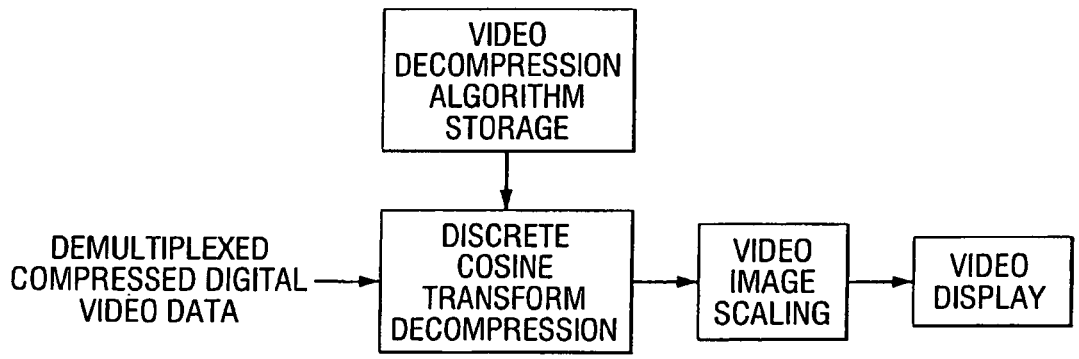
Figure 5A:
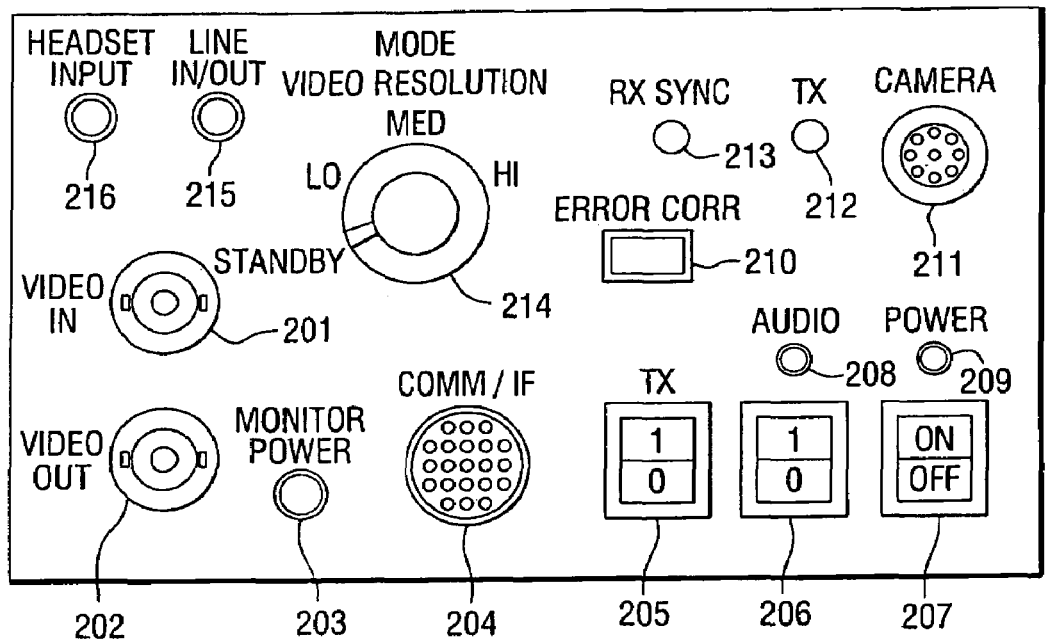
Figure 5B:
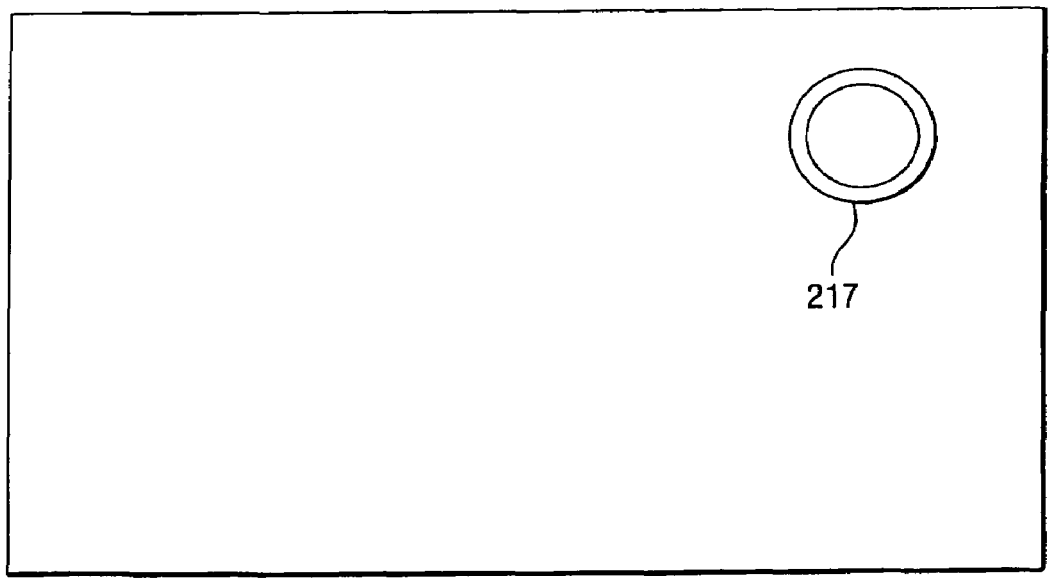
Figure 6A:
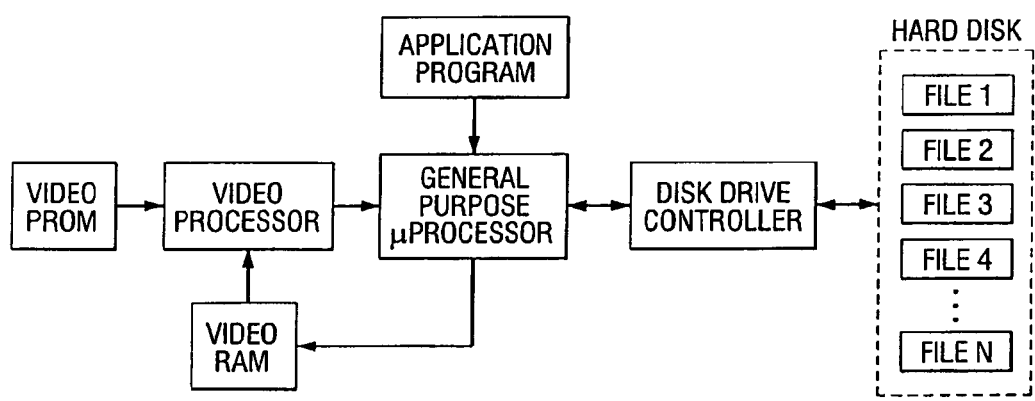
Figure 6B:
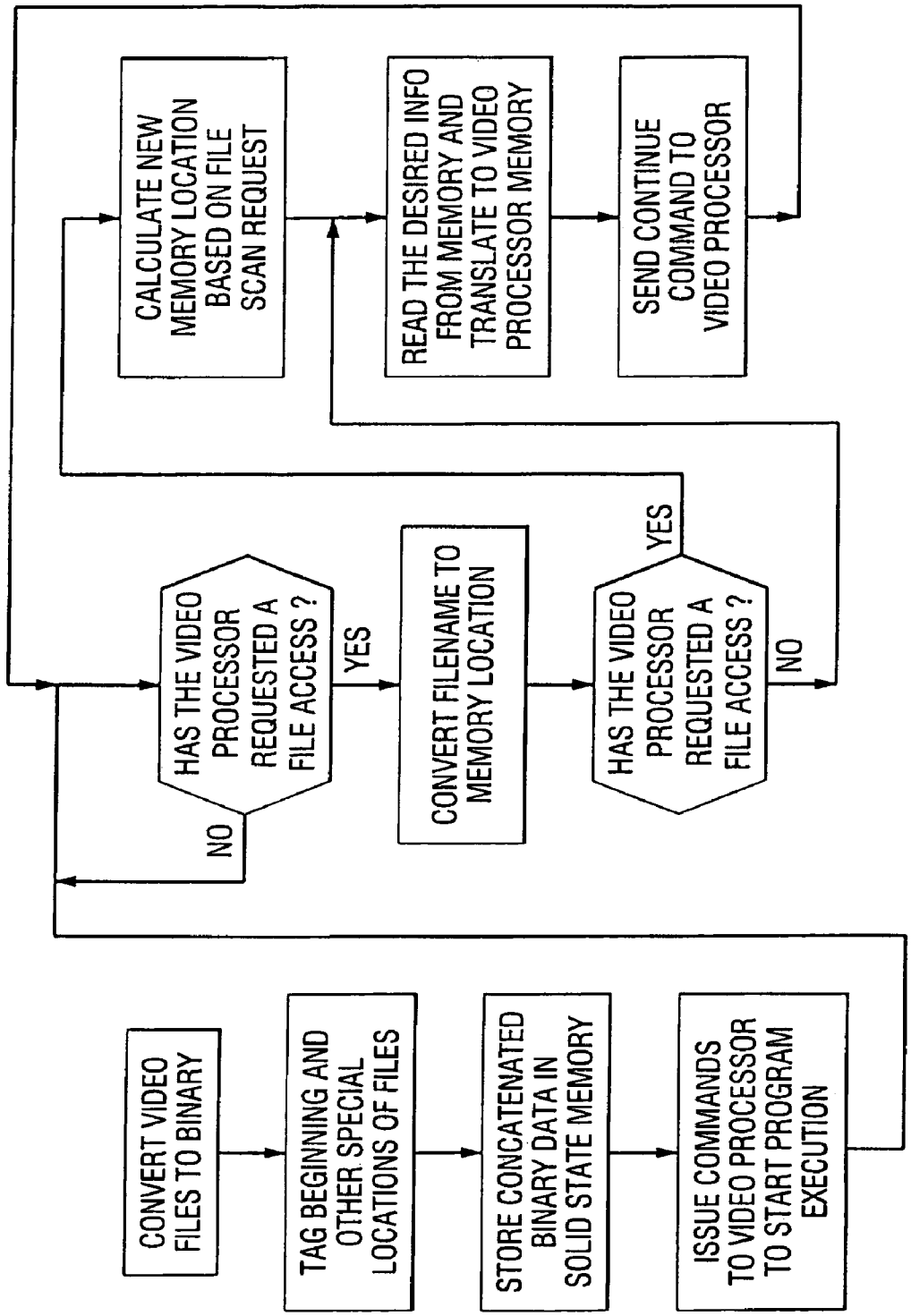
Figure 8:
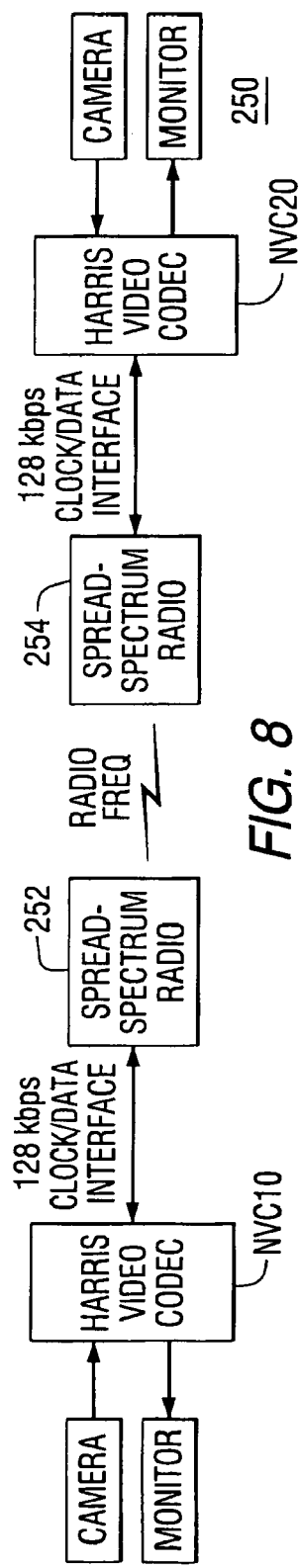
Figure 9:
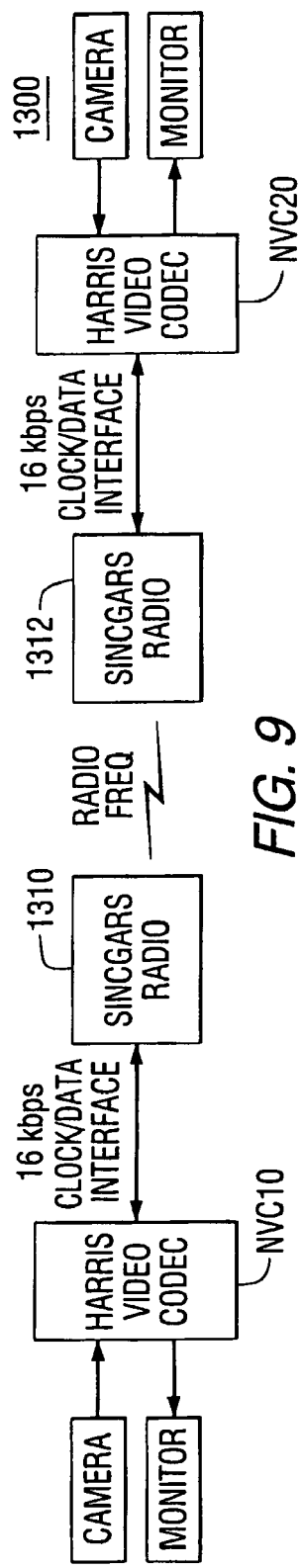
Figure 10:
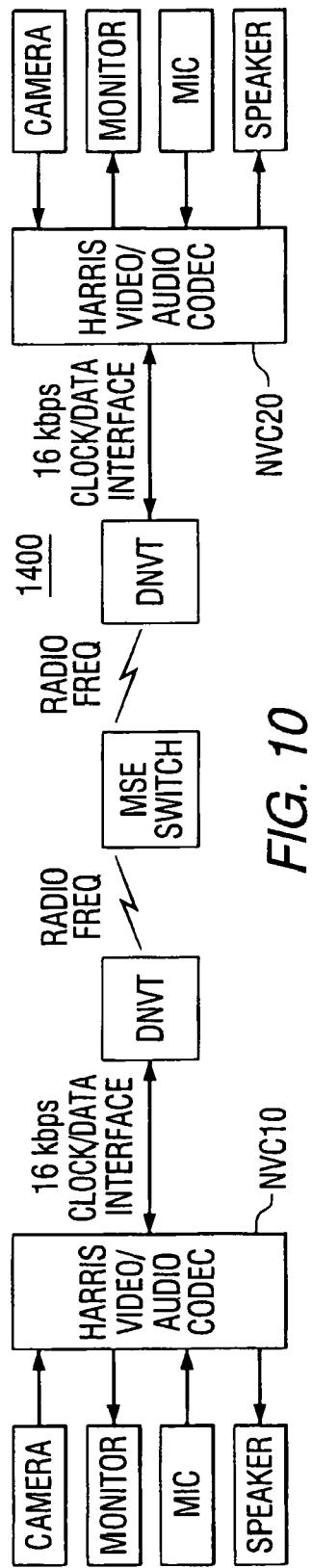
Figure 11:
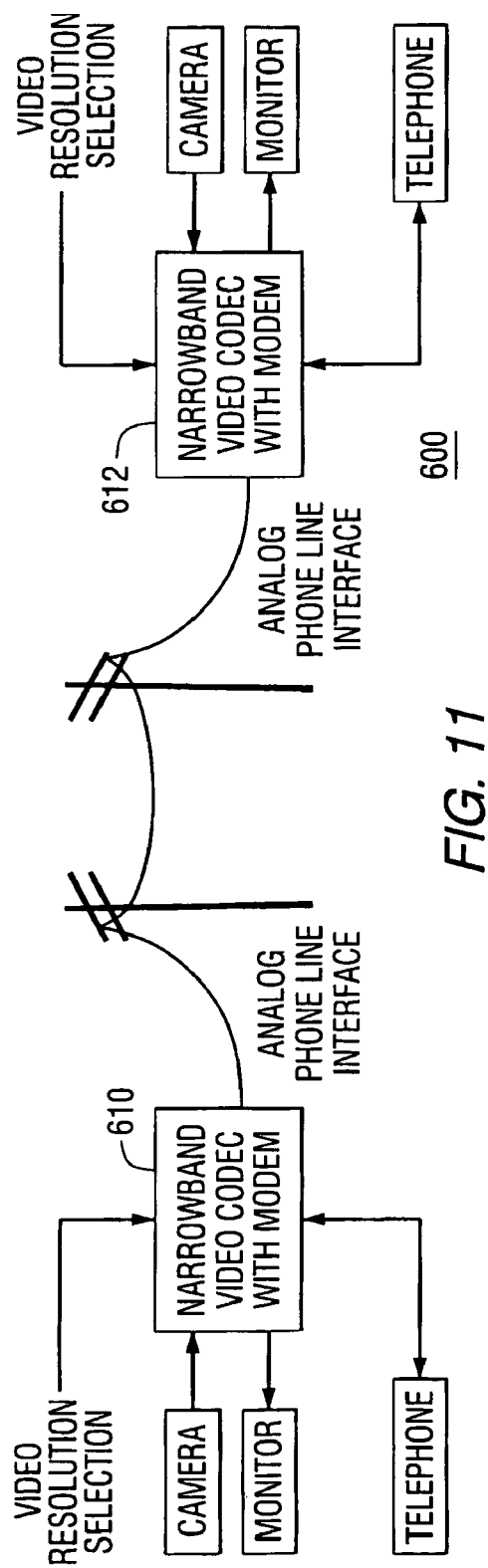
Figure 12:
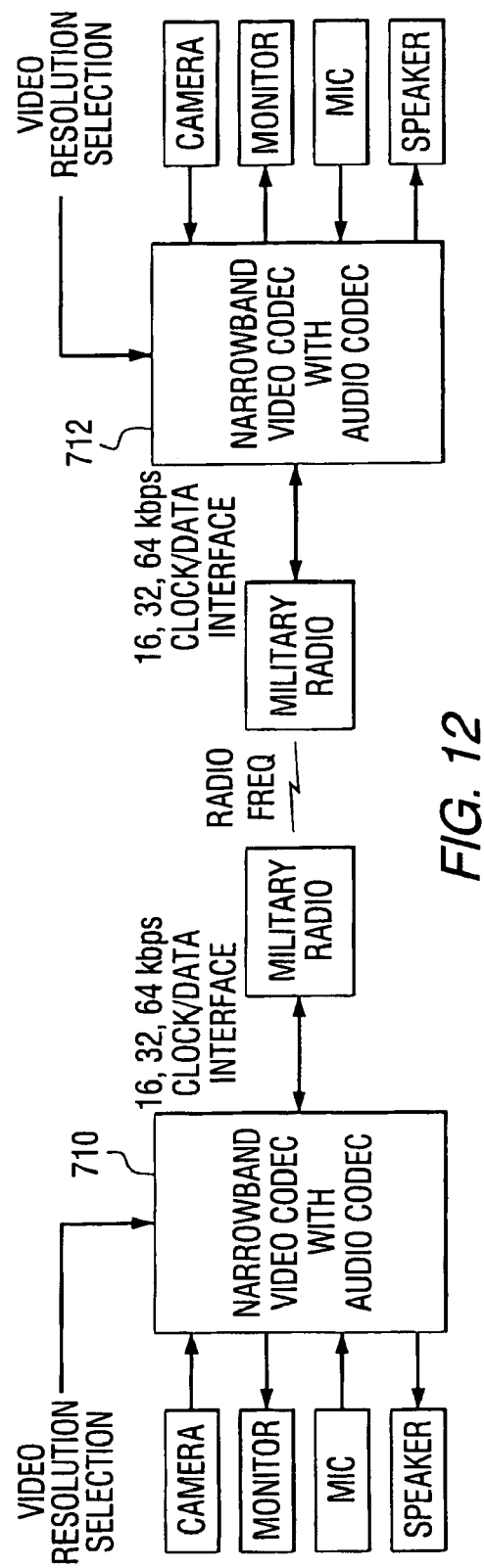

FIGS. 3A, 3B, and 3C are block diagrams of component parts of the NVC;

FIGS. 4A and 4B are functional block diagram of the video and audio demultiplexing, decompression and display steps;

FIGS. 5A and 5B are diagrams of the front and rear of the control panel;

FIGS. 6A and 6B are functional block diagram of a hard disk emulation program;

FIGS. 7A–7D are block diagrams of different data frames for transmission at different rates with different levels of error correction;

FIG. 8 is a functional block diagram of a second embodiment of the invention;

FIG. 9 is a functional block diagram of a third embodiment of the invention;

FIG. 10 is a functional block diagram of a fourth embodiment of the invention;

FIG. 11 is a functional block diagram of a fifth embodiment of the invention;

FIG. 12 is a functional block diagram of a sixth embodiment of the invention;

DETAILED DESCRIPTION

Figure 1:
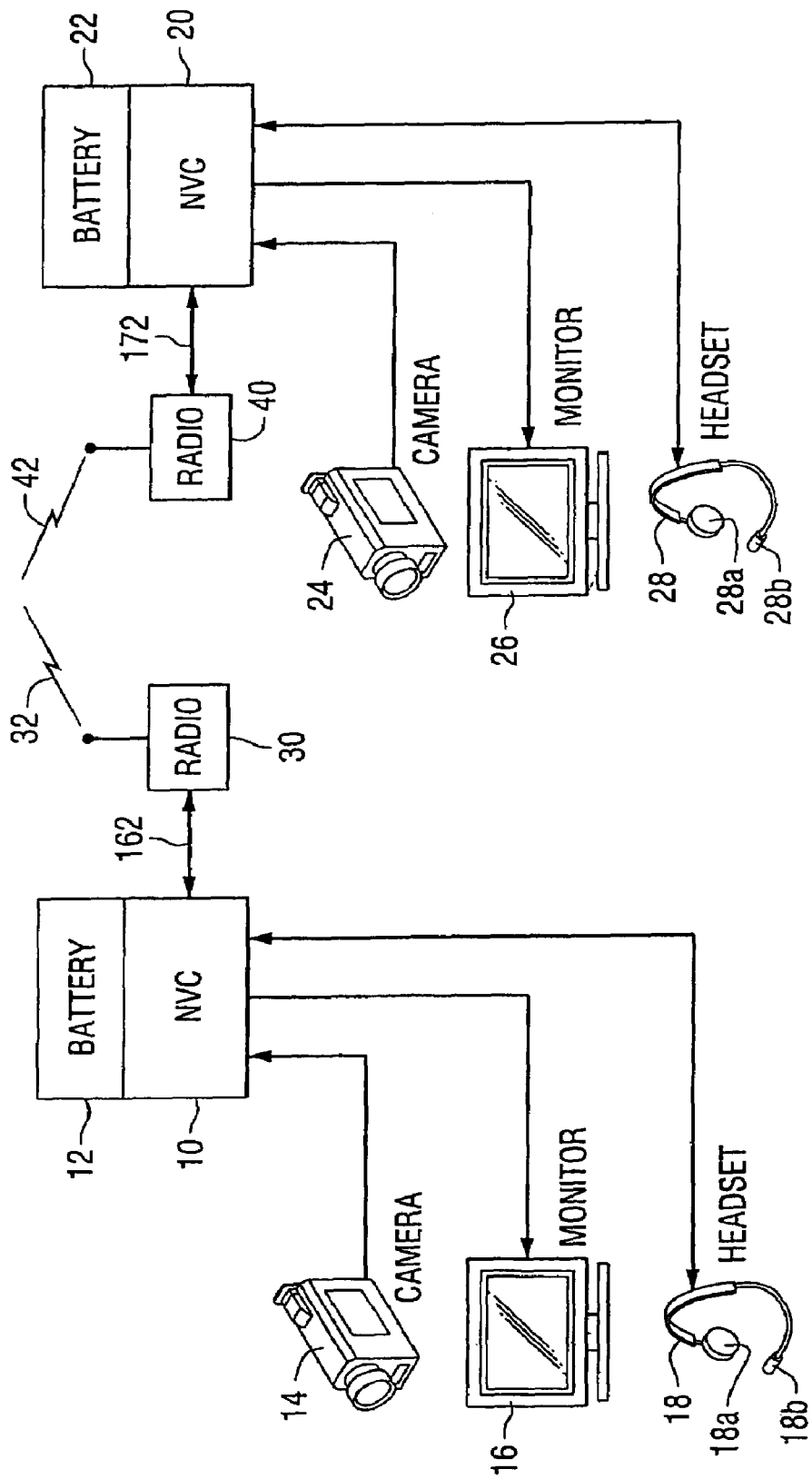
FIG. 1 is a schematic view of a NVC system.

FIG. 1 shows two narrowband codecs (NVC) 10, 20. Each NVC is a full-duplex video/audio compression decompression device designed to operate over tactical military rf communication links. Each NVC unit sends and receives video and audio information via digital data links of 4.8 to 256 kbps using a variety of radios and encryption devices (not shown). A battery 12 supplies power to the NVC 10. A television camera 14, typically a charge coupled device camera, provides a video input to NVC 10. A monitor 16, typically a liquid crystal display device, provides a video display for video signals received by NVC 10 and captured by camera 14. A headset 18 has a speaker and a microphone 18a, 18b, respectively, for generating analog audio output and input signals, respectively, for NVC 10. NVC 10 generates a bit stream of multiplexed bytes of control, data (video and audio) and error correction bits. The bit stream is formatted into frames for transmission as signals 32 over a narrowband rf link by radio 30. In a similar manner, the NVC 10 receives a bit stream from radio 30 and demultiplexes the bit stream into control, data (video and audio) and error correction bytes. The radio 30 broadcasts and receives frequency modulated radio frequency signals 32 over a narrowband rf link. The signals 32 contain real time audio and video information. The radio 30 modulates outgoing signals and demodulates incoming signals. The battery 22, camera 24, monitor 26, headset 28 and radio 40 and signals 42 perform similar functions in connection with NVC 20.

Figure 2:
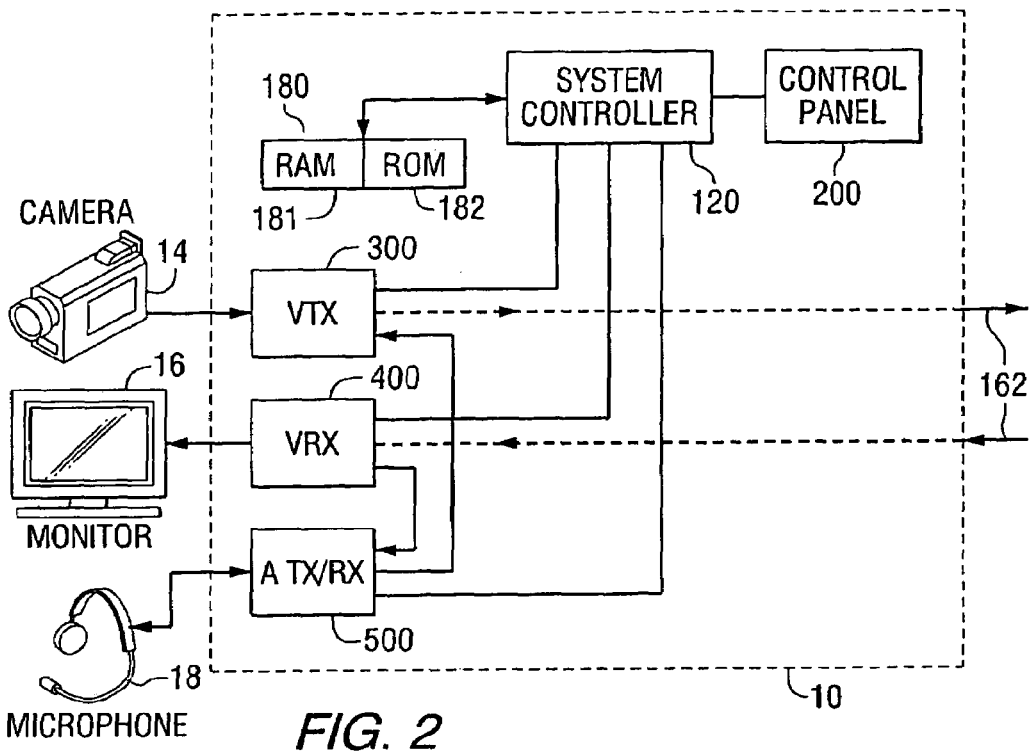
FIG. 2 is a block diagram of a NVC.

Turning to FIG. 2, NVC 10 is shown in greater detail. It includes a video codec transmitter board, VTX 300, a video codec receiver board VRX 400, and an audio transmission and receiver board ATX/RX 500. Separate boards 300, 400 are used to handle video signals due to the complexity and the large amount of data required for video images. System controller 120 controls the codec boards 300, 400, and 500. System controller 120 receives user input signals from the control panel 200. System controller 120 controls the codec board 300, 400, and 500 in accordance with operator input and with programs and data stored in memory 180. The memory 180 includes a random access memory (RAM) 181 and a read only memory (ROM) 182.

FIG. 3A, shows the VTX board 300. It includes a video A/D converter 302 that receives analog video image signals from camera 14 and converts the analog video signals into digital video signals. The digital video signals are transferred to the video digital signal processor (DSP) 304. The DSP 304 compresses the video signals in accordance with a video compression program. The video compression program is supplied from memory 180 via system controller 120. The system controller 120 is shown on board 300. However, those skilled in the art will appreciate that the system controller is a separate processor and that its presence on the board 300 indicates that controller 120 supplies system control and data signals to elements on the board 300. For example, the mode control selection signal, discussed hereinafter, is supplied via the system controller 120 to the A-to-D converter 302 and to the video DSP 304 so that the analog video signals are suitably captured and compressed in accordance with the selected mode. The compressed video signals are placed in a video buffer 306. Data multiplexer 310 selects buffered signals in video buffer 306 together with selected audio digital signals from audio buffer 308. The data multiplexer 310 interleaves the audio signals between video signals and transmits the multiplexed signals to forward error correction circuit 312. The forward error correction circuit 312 performs a Reed-Solomon error correction on digital signals supplied by the data multiplexer 310. For example, the forward error correction circuit 312 may count the number of ones and zeros in the bits supplied by the data multiplexer 310 and then include an indication of the number of ones and zeros in a forward error correction byte. A receiving codec will check the number of ones and zeros in the received digital signal to see if the received ones and zeros correspond to the number of ones and zeros indicated by the forward error correction byte. The forward error correction circuit 312 supplies 18–20 bytes of error correction for a transmitted frame. The frame structure is initiated by the data multiplexer which interleaves bytes of audio and video data in a predetermined fashion. The data multiplexer also receives forward error correction bytes from circuit 312. Thereafter, the data and the forward error correction bytes are supplied to the frame sync generator circuit 314 that supplies at least two control bytes to the front of the received data and forward error correction bytes and transmits a frame of image information to a data randomizer 316. The data randomizer 316 is part of an encryption system that rearranges the bytes in a frame in accordance with a predetermined encryption key. The randomized data is then output to the radio 30 for transmission. The data randomizer 316 receives a clock signal from the radio 30 so that the data are transferred to the radio in accordance with the internal clock of the radio.

The video codec receiver board 400 includes a number of elements that correspond to the elements found on the video codec transmission board 300. The receiver board 400 elements operate in a reverse manner when compared to the operation of the components of the transmission board 300. Data derandomizer 416 receives a clock signal from radio 30 as well as image and audio digital data. The data derandomizer 416 operates in accordance with an encryption key to reorder the bytes of information into a frame. The frame sync detector 414 reads the control bytes at the beginning of the frame and forwards the frame of information to a forward error correction circuit 412. The forward error correction circuit 412 performs a Reed-Solomon error correction operation on the video and audio data to correct any errors in accordance with 18–20 bytes of error correction information found at the end of a frame. The error corrected information is then fed to a data demultiplexer 410 which separates the video data bytes from the audio data bytes. The video data bytes are passed to video buffer 406. A second video digital signal processor 404 decompresses bytes of video data in accordance with the decompression program received from system controller 120. The decompressed video data signals are converted to analog video signals by the video D-to-A converter 402. Monitor 16 receives the analog video signals and displays an image in accordance with those signals.

With reference to FIG. 3C, the audio transmitter and receiver board 500 is shown. An audio digital signal processor 504 receives an audio compression algorithm and other control signals from system controller 120. The NVC 10 has three possible modes of audio operation. The audio can be off, or it can be operated in one of two compression and decompression programs. The selected audio compression or decompression program depends upon the speed of data transmission. For data transmission at 16 kbps, one algorithm is used. For higher rates, another algorithm is used. The compression and decompression algorithms are supplied by controller 120 from the memory 180. An audio A-to-D converter 502 receives analog audio input signals from the headset 18, converts them into digital audio signals, and transfers the digital audio signals to audio input buffer 510. The audio DSP 504 takes bytes of audio data from buffer 510, compresses them, and passes the bytes to audio transmit buffer 308 of the video codec transmission board 300. The audio bytes held in the audio transmit buffer 308 are multiplexed with video bytes from video transmit buffer 306. The audio DSP 504 decompresses received audio digital signals that are output from audio receiver buffer 408 on the receiver board 400. The decompressed signals are temporally stored in audio buffer 512. A D-to-A converter 503 converts the digital audio signals in buffer 512 into analog audio output suitable for understanding by the user of the NVC 10.

An operator control panel 200 (FIG. 5) lets a user select and/or change one or more features of the NVC 10. System controller 120 receives signals from control panel 200 and operates the NVC in accordance with those signals. Control panel 200 has a video input connector 201 that receives a BNC connector coupled to a NTSC video input source. Connector 202 is a video output port. Communications port 204 is a multi-pin port that supports an interface for signals 162 from the radio 30. In particular, it supports military standard 188–114 and RS-422 interface. TX/RX switch 205 is a transmit or receive switch. As mentioned above, the NVC 10 is a half-duplex and full-duplex device. In the half duplex mode, the "1" of TX/RX switch 205 is depressed for transmitting and the "0" is depressed for receiving. In the full duplex mode, switch 205 selects between a live self-view image (depress 1) or the far-end compressed image (depress 0) being displayed on a monitor 16. Audio switch 206 turns on and off the audio channel. Switch 206 is not used in the receive mode. 1 is depressed to turn the audio channel on and the user depresses 0 to turn the audio channel off. Switch 207 is the power switch. An audio LED 208 indicates if the audio channel is being received. Power LED 209 indicates that DC power is received by NVC 10 after the power switch 207 is placed in the on position. Error correction switch 210 has two positions. The LO position provides a minimum amount of correction and the HI position provides a maximum amount of error correction. Camera connector 211 connects the NVC 10 to a CCD video-camera, such as SONY XC-999 minicam. Transmission LED 212 indicates when NVC 10 is transmitting video and/or audio data. Receiver synchronous LED 213 indicates when NVC 10 is receiving and synchronized to a valid video bit stream. Mode switch 214 is a four position switch that sets the video resolution level and controls the digital data mode of certain military radios that use the MIL STD 188–114 interface. The digital data mode allows digital data to replace the normal analog voice communications for the radio. In the standby mode, the switch deasserts the digital data mode control (DDMC) and the push-to-talk (PTT) outputs at the communications connector 204. When the mode switch is not in the standby position, NVC 10 asserts the DDMC signal. Then, if the transmit receive switch 205 is in the transmit position, NVC 10 also asserts the PTT output and places the radio 30 in the transmit mode. In the LO position, switch 214 selects a low video clarity (high video frame rate) for transmission. In the MED position, switch 214 selects a medium video clarity (medium video frame rate) for transmission. In the HI position, switch 214 selects a high video clarity (low video frame rate) for transmission. Line IN/OUT jack 215 is a three conductor mini-jack connector that is used as the audio input/output port with a standard line level device such as a video cassette recorder. Headset in/out jack 216 is also a three conductor mini-jack connector that is used as the audio input/output port with a standard audio headset. On the back of the control panel 200 is a DC power input 17. The DC power input 17 connects the NVC 10 to the battery 12. The DC power source may be a +18 volt to +36 volt power source. The NVC 10 has suitable internal circuitry for deriving its lower voltage supplies. The connector 217 is compatible with a standard interface to military standard BA-5590 or equivalent battery.

The NVC 10 operates in the following manner. After the power switch 207 is set into the on position, NVC 10 enters a power on mode for approximately 15 seconds. During this time, a video compression/decompression algorithm is downloaded from the memory 180 to the DSPs 304, 404. The audio compression/decompression algorithm is downloaded in accordance with the audio mode (on/off) and, if on, in accordance with the link rate. Any changes made to the switches on control panel 200 will not take effect until the power on mode is completed. The NVC 10 normally transmits only a portion of the camera image that changes from video frame to video frame. However, the NVC 10 has an internal timer in controller 120 which directs the NVC 10 to send a complete screen refresh every 30 seconds during a transmit mode. A party receiving the transmission sees an approximately 0.5 second freeze and update of the image. This full image refresh is done to erase errors that may occur during the transmission process. The NVC 10 also performs a complete screen refresh immediately after any resolution change.

The NVC 10 has a variety of modes of operation which are selected by the user via the control panel 200 and jumper settings at the communications input jack 204. The specific operating mode is generally controlled by the transmit circuitry of the NVC 10. The receive circuitry automatically recognizes and adapts to the incoming data stream. The audio switch can be off or on while the mode switch is LO, MED or HI. In either of the three modes, the error correction switch may be low or high. If the audio switch is off, the communication link rate may be between 4.8 and 256 kbps. When the audio switch is on and the link rate is 16 kbps, the LPC 10 audio algorithm is downloaded from memory 180 (2.4 K). When the link rate is either 32, 64, 128 or 256 kbps, a CELP audio algorithm (4.8 K) is downloaded from memory 180.

In the half duplex transmit mode, the NVC 10 transmits when the transmit switch 205 is placed in the transmit position. A valid clock signal and rate are required from the radio 30 before NVC 10 transmits. The operator is notified of the transmit mode by the illumination of the transmit LED 212 on control panel 200. There is approximately a four second delay when switching between receive and transmit modes. When audio switch 206 is on, the analog audio input is digitized, compressed and transmitted simultaneously with the video input. The transmit LED 212 signals the operator that the video/audio transmission has started. Monitor 16 displays the live local camera image when the transmit receive switch 205 is moved to its transmit position. Even if there is no radio, the NVC displays the camera image to allow the user to properly position the camera.

As mentioned above, the operator may select different error correction levels, resolution modes, and audio transmission algorithms. Any change in position of the error correction level or audio switch will result in a brief three second interruption of the transmit mode.

The NVC 10 may transmit video only. In this case, the NVC 10 will accept any clock rate from 4.8 kHz to 256 kHz. The image clarity remains fairly constant over this range while the video frame rate increases proportionally with the increasing clock rate. In order to transmit video and audio simultaneously, the NVC-10 is supplied with one of five clock rates: 16 kHz, 32 kHz, 64 kHz, 128 kHz, and 256 kHz. The video rate will vary from 4.8 kbps-230.4 kbps, depending upon the video mode (LO, MED, HI), the error correction setting (LO, HI), and the audio switch (on/off). The video resolution will likewise vary between 352 by 240 pixels and 176 by 120 pixels. The video frame rate can be as low as 0.15 frames per second to as high as 30 frames per second. In general, the lower the image clarity, the higher the frame rate and the higher the image clarity, the lower the frame rate.

A number of user operations will reset the software of the NVC 10. For example, changing the audio switch during the transmit mode and changing the error correction switch will both reset the software. Software reset causes a delay that lasts approximately three seconds. After reset, the new resolution and/or error correction mode changes will take place. Changes made during the receive mode generally have no effect. The transition between transmit and receive modes also causes the software reset that lasts approximately five seconds.

The NVC 10 is capable of freezing any image displayed on the monitor regardless of the resolution setting at the moment of transmission. The received image will be frozen whenever the operator initiates a transition of the mode switch into the high resolution position. However, if the NVC 10 is already in the HI position, then the NVC-10 will display a normal video update sequence. The operator will have to switch out of the HI position for at least one second and back to the HI position to cause a freeze. The frozen image can be restored when moving the mode switch to either the medium or the low position.

Error correction circuits 312, 412 performs a Reed-Solomon error correction technique that operates in one of two modes selected from control panel 200. The user may choose more error correction overhead when the communication channel has a higher bit error rate. The video frame rate varies inversely with the amount of error correction bytes. In the LO error correction mode, the overhead required is about 19% while in the HI error correction mode, the overhead is about 50%.

Radios 30, 40 both receive and transmit digital data on an rf carrier wave. The radio may use any suitable modulation system, including, but not limited to, amplitude, frequency or phase modulation. Frequency modulation is preferred. In particular, the radio 30 receives compressed, multiplexed, framed data bits and generates a signal corresponding to the ones and zeros of the digital signals.

The NVC 10 architecture allows for a flexible and inexpensive implementation since many of the major operations are essentially performed in software. As such, upgrades or totally different algorithms can be downloaded via rf transmission and used at any time. The re-configurable parts of this system are described in Table A.

TABLE A

| Parameter | Possible Values |
| --- | --- |
| Video Algorithm | JPEG, MPEG, H.261, Proprietary |
| Audio Algorithm | LPC 10, CELP |
| Error Correction | Reed Solomon with programmable level of FEC overhead data |
| Frame Structure | H.221, Proprietary |

Digital compression and decompression techniques do not retransmit unchanged portions of an image. So, an error may remain undetected in an image. To overcome this problem of persistent image error, the system controller 120 has an image refresh function. After a controlled amount of time, typically thirty seconds, the transmitted video image is entirely refreshed.

One of the features of the invention is its ability to use standard components. For example, the video components 302, 304, 306, and 402, 404, 406 are programmable chip sets supplied by Integrated Information Technology. However, the IIT chip set is designed to work on a standard personal computer platform with a general purpose microprocessor. The general purpose microprocessor runs an application program that communicates with a video processor and provides an interface to the disk drive controller. One of the features of the invention is the elimination of the hard disk drive.

The NVC 10 has no general purpose microprocessor, disk drive controller, or hard disk drive. Instead, the NVC controller 120 and embedded firmware emulate the hard disk interface used by the IIT video chip set and its associated application program. A functional block diagram of the IIT hardware design is shown in FIG. 6A. As shown in FIG. 6A, the video DSP 304 or 404 issues commands for acces to a hard disk drive. Files stored on the hard disk drive contain application programs executed by the DSP. However, it would be costly and cumbersome to place a disk drive in NVC 10. The requirement for a hard disk drive is one of the drawbacks of prior art systems. On the other hand, it would be efficient use existing hardware such as the IIT processor.

The invention solves the problem by eliminating the hard disk drive through the use of a hard disk emulation program. The emulation function and program is diagrammed in the flow chart given in FIG. 6B. As shown therein, a program stored in the controller 180 and its memory 182 converts the video filenames to binary and tags the locations of files, such as the compression and decompression algorithms. When the controller 120 requests a file from the hard disk, the program shown in FIG. 6B converts the filename given by the processor 120 into the memory location in memory 180 where the algorithm, normally stored on a hard disk, is now stored in a solid state memory device. As such, the hard disk file names normally associated with the IIT chip set can be used in the NVC 10 without modification of the IIT chip set.

The video compression/decompression download operation is shown in FIG. 4A. The video compression/decompression algorithm uses a discrete cosine transform. One parameter associated with all discrete cosine transform algorithms is the video pixel quantization level. This level essentially determines the sharpness of the digitally compressed video image. A tradeoff is made by the user between image sharpness and video frame rate. As the sharpness increases, the frame rate decreases for a fixed communication link bandwidth. Since video compression algorithms only send the changes between video frames, a low amount of motion in the video image causes a reduction in the amount of data transmitted. The NVC 10 takes advantage of this reduction in motion (and consequently video data) in order to increase the quantization level and sharpness of the image. Therefore, as the amount of motion decreases, the image sharpness increases. When there is more motion in the captured video image, the sharpness is automatically decreased back to the original level.

The digital video compression and decompression is performed by DSP 504 which implements a discrete cosine transform as described by the video algorithm software. The NVC 10 is flexible because it can be use different video software algorithms. FIG. 4B shows a flow diagram of the video algorithm download operation. The video compression and decompression algorithms are stored in RAM 182. If the user desires a new or upgraded algorithm, it can be downloaded from the rf link 32. The sequence of operations for video compression and video decompression are shown in FIGS. 4A, 4B respectfully. Both video compression and decompression occur simultaneously in real time. Additionally, the outgoing image can be displayed on the monitor as a picture-in-picture along with the incoming image.

Frame Structure

Controller 120 uses software stored in memory 180 to multiplex video and audio bytes into data bytes and to frame bytes of control, data, and error correction information. Each frame is output as a series of bytes. The sequence bytes in each frame is identical for a given mode of operation. Each frame in a typical sequence includes two control bytes followed by sequential sets of data bytes and ends with a number of error correction bytes. Each set of data bytes has at least one audio byte and a plurality of video bytes. Sequential audio bytes are separated by the same number of video bytes.

Figure 7A:
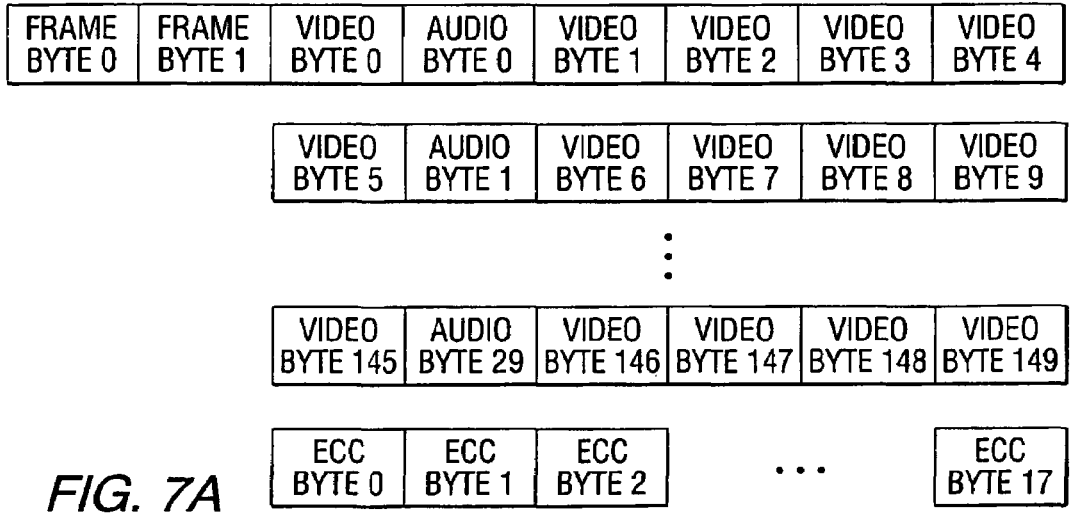

A typical frame is shown in FIG. 7A. The frame size consists of 200 bytes, the error correction mode is LO (18 bytes) and the clock rate may be either 16 or 32 kHz. The first two bytes contain control information. These bytes tell the length of the frame (200 bytes or 40 bytes) and tell whether the audio is on or off. The error correction setting controls the length of the frame. In the LO position there are 18 error correction bytes in a frame of 200 total bytes. In the HI position there are 20 error correction bytes in a frame of 40 total bytes. The sets of data bytes have the same pattern of video and audio bytes. There is one audio byte for every five video bytes and sequential audio bytes are separated from each other by five video bytes. After the last video byte 149, there are 18 error correction bytes. The information in the error correction bytes are provided by the error correction circuit 118.

Figure 7B:
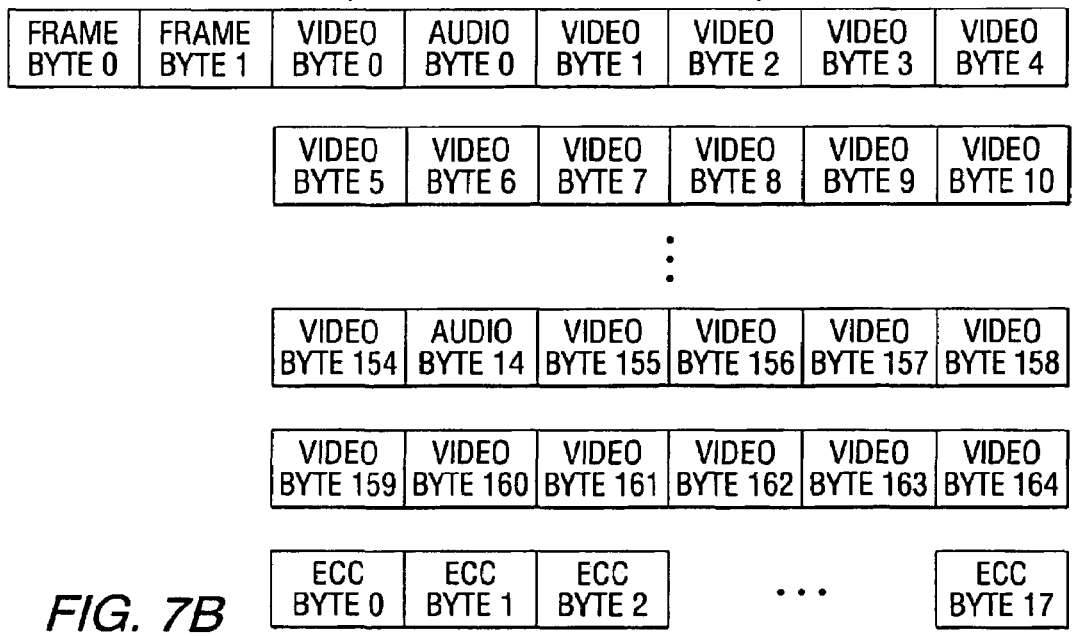

A different frame structure is shown in FIG. 7B. There, the clock rate is 64 or 128 kHz. Note that there are only 15 audio bytes in the frame of FIGS. 7B and 165 video bytes. A higher clock rate permits more video bytes to be sent in a given frame.

Figure 7C:
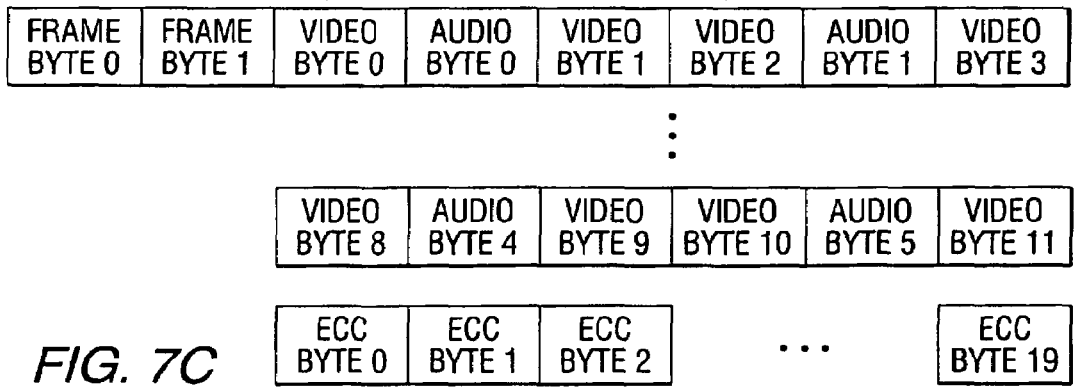
Figure 7D:
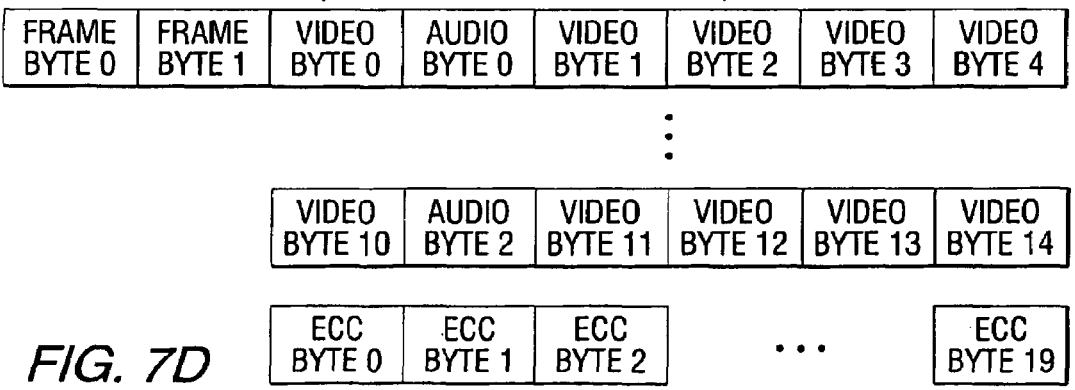

FIGS. 7C and 7D are examples of operation in the HI correction mode. In FIG. 7C, there are only 40 bytes in each frame. In both examples, half of each frame include 20 error correction bytes. The error correction overhead is 50%. At the lower clock rate of FIG. 7C, there are 18 data bytes, including 12 video bytes and six audio bytes. Note that the audio bytes are spaced from each other by two video bytes. The first two bytes are control bytes that tell the length of the frame size and whether the audio is on or off. FIG. 7D shows another 40 byte frame structure where there are three audio bytes, 15 video bytes and 20 error correction bytes. The operator may control error correction without re-transmitting corrupted data.

A summary of frame structures are shown in the following frame structure table:

| Clock Rate | Frame Size Bytes | Data Bytes | Video Bytes | Audio Bytes | Ratio V/A | Audio Rate | Video Rate |
|---|---|---|---|---|---|---|---|
| 16000 | 40 | 18 | 12 | 6 | 2 | 2400 | 4800 |
| 32000 | 40 | 18 | 12 | 6 | 2 | 4800 | 9600 |
| 64000 | 40 | 18 | 15 | 3 | 5 | 4800 | 24000 |
| 128000 | 40 | 18 | 15 | 3 | 5 | 9600 | 48000 |
| 16000 | 200 | 180 | 150 | 30 | 5 | 2400 | 12000 |
| 32000 | 200 | 180 | 150 | 30 | 5 | 4800 | 24000 |
| 64000 | 200 | 180 | 165 | 15 | 11 | 4800 | 52800 |
| 128000 | 200 | 180 | 165 | 15 | 11 | 9600 | 105600 |

Note: At 128000 kbps, half of the audio bytes are unused.

A second embodiment of the invention provides a video-only transmission system 250 using commercially available spread-spectrum radios 252, 254. This device uses the codec boards 300, 400, 500 configured as shown in FIG. 8. The units 10, 20 transmit a digitally compressed video at a data rate of 256 kbps over a distance of 5 miles.

A third embodiment includes a system 1300 as shown in FIG. 9 unit 1300 allows video and audio communication via SINCGARS military radios. The SINCGARS radios 1310, 1312 are used by the military in a tactical field type of environment. The video algorithm and resolution were fixed in units 10, 20 and the units operate at a data rate of 16 kbps.

A fourth embodiment provides a conference system 1400 for military applications and allows this user to send video and audio data over a field telecommunications equipment called MSE. The NVCs 10, 20 are coupled to a military device called a Digital Nonsecure Voice Telephone (DNVT) as shown in FIG. 10.

The Narrowband Video Code design (described above) can be modified to add a 28.8 kbps modem so that with the modified codecs 610, 612 digital video could be transmitted over ordinary phone lines. Such a system 600 is shown in FIG. 11 and is especially useful by law enforcement organizations. The system 600 has multiple, user selectable video resolutions and could operate over link rates from 2.4 to 64 kbps.

What is claimed is:

1. A narrowband video codec for generating an output stream of control, data, and error correction bits, said narrowband codec comprising:
   means for framing the output, control and data bits into a series of sequential frames of bytes for transmission over an rf link of a controlled frequency wherein each frame comprises an identical sequence of bytes;
   each frame comprising, in sequence:
   two control bytes;
   a plurality of sequential sets of data bytes, each set of data bytes comprising a sequence of at least one audio byte and a plurality of video bytes, at least one of said plurality of video bytes between each sequential audio byte, each set of data bytes having its audio and video bytes in the same order as each other set of data bytes; and
   a plurality of error correction bytes.

2. The narrowband video codec of claim 1 wherein each set of data bytes has the same number of video bytes between sequential audio bytes.

3. The narrowband video codec of claim 1 wherein the control bytes include data bit signals representative of the number of bytes in the frame.

4. The narrowband codec of claim 1 further comprising means for periodically refreshing a decompressed video image.

5. The narrowband codec of claim 1 further comprising means for controlling of the level of error correction without re-transmitting corrupted data.

6. The narrowband codec of claim 1 further comprising means for synchronizing the frames to the data rate of the rf link.

7. The narrowband codec of claim 1 further comprising a battery power supply.

8. The narrowband codec of claim 7 wherein the power supply voltage is between 18 and 36 volts.

9. The narrowband video codec of claim 1 wherein each frame comprises 200 bytes including two control bytes, 180 data bytes and 18 error correction bytes.

10. The narrowband video codec of claim 1 wherein each frame comprises 150 video bytes and 30 audio bytes.

11. The narrowband video codec of claim 10 wherein sequential audio bytes are separated from each other by five video bytes.

12. The narrowband video codec of claim 9 wherein each frame comprises 165 video bytes and 15 audio bytes.

13. The narrowband video codec of claim 10 wherein sequential audio bytes are separated from each other by eleven video bytes.

14. The narrowband video codec of claim 1 wherein each frame comprises 40 bytes including two control bytes, 18 data bytes and 20 error correction bytes.

15. The narrowband video codec of claim 14 wherein each frame comprises 12 video bytes and 6 audio bytes.

16. The narrowband video codec of claim 15 wherein sequential audio bytes are separated from each other by two video bytes.

17. The narrowband video codec of claim 1 wherein each frame comprises 15 video bytes and 3 audio bytes.

18. The narrowband video codec of claim 15 wherein sequential audio bytes are separated from each other by five video bytes.

* * * * *